United States Patent
McDaniel et al.

(10) Patent No.: US 12,122,857 B2
(45) Date of Patent: Oct. 22, 2024

(54) CONTROLLING LONG-CHAIN BRANCH CONTENT WITH DUAL ACTIVATOR-SUPPORTS

(71) Applicant: Chevron Phillips Chemical Company LP, The Woodlands, TX (US)

(72) Inventors: Max P. McDaniel, Bartlesville, OK (US); Graham R. Lief, Bartlesville, OK (US); Qing Yang, Bartlesville, OK (US); Carlos A. Cruz, Kingwood, TX (US); Yongwoo Inn, Bartlesville, OK (US); Jared Barr, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 150 days.

(21) Appl. No.: 17/552,451

(22) Filed: Dec. 16, 2021

(65) Prior Publication Data
US 2023/0192914 A1    Jun. 22, 2023

(51) Int. Cl.
| | |
|---|---|
| C08F 4/6592 | (2006.01) |
| C07F 17/00 | (2006.01) |
| C08F 4/02 | (2006.01) |
| C08F 4/659 | (2006.01) |
| C08F 10/02 | (2006.01) |
| C08F 10/14 | (2006.01) |
| C08F 210/16 | (2006.01) |

(52) U.S. Cl.
CPC .............. *C08F 10/02* (2013.01); *C07F 17/00* (2013.01); *C08F 4/02* (2013.01); *C08F 4/025* (2013.01); *C08F 4/65916* (2013.01); *C08F 10/14* (2013.01); *C08F 210/16* (2013.01)

(58) Field of Classification Search
CPC . C08F 4/65916; C08F 210/16; C08L 23/0815
See application file for complete search history.

(56) References Cited

U.S. PATENT DOCUMENTS

| | | | |
|---|---|---|---|
| 2,470,872 A | 5/1949 | Secor | |
| 4,588,790 A | 5/1986 | Jenkins, III | |
| 5,352,749 A | 10/1994 | Dechellis | |
| 5,436,304 A | 7/1995 | Griffin | |
| 6,136,936 A | 10/2000 | Dall'Occo | |
| 7,026,494 B1 | 4/2006 | Yang | |
| 7,041,617 B2 | 5/2006 | Jensen | |
| 7,101,936 B2 | 9/2006 | Weng | |
| 7,199,073 B2 | 4/2007 | Martin | |
| 7,226,886 B2 | 6/2007 | Jayaratne | |
| 7,294,599 B2 | 11/2007 | Jensen | |
| 7,312,283 B2 | 12/2007 | Martin | |
| 7,456,243 B2 | 11/2008 | Jensen | |
| 7,517,939 B2 | 4/2009 | Yang | |
| 7,531,606 B2 | 5/2009 | Hendrickson | |
| 7,576,163 B2 | 8/2009 | Yang | |
| 7,598,327 B2 | 10/2009 | Shaw | |
| 7,601,665 B2 | 10/2009 | McDaniel | |
| 7,619,047 B2 | 11/2009 | Yang | |
| 7,652,160 B2 | 1/2010 | Yang | |
| 7,732,542 B2 | 6/2010 | Yang | |
| 7,842,763 B2 | 11/2010 | Jensen | |
| 7,884,163 B2 | 2/2011 | McDaniel | |
| 7,919,639 B2 | 4/2011 | Murray | |
| 7,960,487 B2 | 6/2011 | Yang | |
| 8,030,241 B2 | 10/2011 | Jensen | |
| 8,080,681 B2 | 12/2011 | Murray | |
| 8,138,113 B2 | 3/2012 | Yang | |
| 8,268,944 B2 | 9/2012 | Yang | |
| 8,309,485 B2 | 11/2012 | Yang | |
| 8,426,538 B2 | 4/2013 | Jensen | |
| 8,623,973 B1 | 1/2014 | McDaniel | |
| 8,703,886 B1 | 4/2014 | Yang | |
| 8,957,168 B1 | 2/2015 | Yang | |
| 9,006,367 B2 | 4/2015 | McDaniel | |
| 9,023,959 B2 | 5/2015 | McDaniel | |
| 9,163,098 B2 | 10/2015 | McDaniel | |
| 9,181,369 B2 | 11/2015 | Tso | |

(Continued)

FOREIGN PATENT DOCUMENTS

| | | |
|---|---|---|
| CN | 105745234 A | 7/2016 |
| CN | 105849138 A | 8/2016 |

(Continued)

OTHER PUBLICATIONS

Search Report issued in corresponding Chinese Application No. 2021800188748, mailed on Jun. 29, 2023, 3 pp.
Search Report issued in corresponding Chinese Application No. 2021800350639 mailed on Jun. 5, 2023, 3 pp.
International Search Report and Written Opinion issued in corresponding PCT Application No. PCT/US2022/080955, mailed on Apr. 6, 2023, 12 pp.
Takao Tayano, et al., "Morphology control of clay-mineral particles as supports for metallocene catalysts in propylene polymerization", Polyolefins Journal, Jun. 30, 2016 (Jun. 30, 2016), pp. 79-92, (Continued)

*Primary Examiner* — Caixia Lu
(74) *Attorney, Agent, or Firm* — Merchant & Gould P.C.

(57) ABSTRACT

Methods for controlling the long chain branch content of ethylene homopolymers and copolymers produced in a polymerization process include the steps of contacting a metallocene compound, an organoaluminum compound, a high LCB activator-support, and a low LCB activator-support to form a catalyst composition, contacting the catalyst composition with ethylene and an optional olefin comonomer in a polymerization reactor system under polymerization conditions to produce an ethylene polymer having a LCB content, and controlling the relative amount of the high LCB activator-support and the low LCB activator-support in the catalyst composition to adjust the LCB content of the ethylene polymer.

21 Claims, 6 Drawing Sheets

(56) References Cited

U.S. PATENT DOCUMENTS

| | | |
|---|---|---|
| 9,181,370 B2 | 11/2015 | Sukhadia |
| 9,273,170 B2 | 3/2016 | Hlavinka |
| 9,303,109 B2 | 4/2016 | Greco |
| 9,346,896 B2 | 5/2016 | McDaniel |
| 9,365,667 B2 | 6/2016 | McDaniel |
| 9,441,063 B2 | 9/2016 | Cruz |
| 9,481,749 B1 | 11/2016 | Clark |
| 9,670,296 B2 | 6/2017 | McDaniel |
| 9,856,339 B2 | 1/2018 | Mariott |
| 9,975,976 B1 | 5/2018 | Tso |
| 10,239,975 B2 | 3/2019 | McDaniel |
| 10,513,572 B2 | 12/2019 | Mariott |
| 10,538,604 B2 | 1/2020 | Crowther |
| 10,604,604 B2 | 3/2020 | Yu |
| 10,676,553 B2 | 6/2020 | McDaniel |
| 10,723,819 B2 | 7/2020 | Holtcamp |
| 10,808,053 B2 | 10/2020 | Li |
| 10,913,808 B2 | 2/2021 | Holtcamp |
| 10,919,996 B2 | 2/2021 | McDaniel |
| 10,927,202 B2 | 2/2021 | Lue |
| 10,927,203 B2 | 2/2021 | Lue |
| 10,927,205 B2 | 2/2021 | Stevens |
| 10,954,321 B2 | 3/2021 | Lee |
| 11,014,997 B2 | 5/2021 | Ding |
| 11,198,747 B2 | 12/2021 | Holtcamp |
| 11,208,514 B2 | 12/2021 | McDaniel |
| 11,267,919 B2 | 3/2022 | Praetorius |
| 11,274,171 B2 | 3/2022 | Cirriez |
| 11,274,196 B2 | 3/2022 | Li |
| 11,339,279 B2 | 5/2022 | Ding |
| 11,787,881 B2 | 10/2023 | Silva |
| 2005/0203261 A1* | 9/2005 | Sukhadia ............ C08F 10/02 526/943 |
| 2011/0172322 A1 | 7/2011 | Michel |
| 2015/0126692 A1 | 5/2015 | Sukhadia |
| 2016/0194420 A1 | 7/2016 | Cymbaluk |
| 2017/0029541 A1 | 2/2017 | Ymbaluk |
| 2020/0362064 A1 | 11/2020 | Ding |
| 2021/0013619 A1 | 1/2021 | Alkhateeb |
| 2021/0309841 A1 | 10/2021 | Ding |
| 2022/0127395 A1 | 4/2022 | Praetorius |
| 2022/0267579 A1 | 8/2022 | Ding |
| 2023/0192909 A1 | 6/2023 | McDaniel |

FOREIGN PATENT DOCUMENTS

| | | |
|---|---|---|
| CN | 104045902 B | 8/2017 |
| CN | 104781319 B | 4/2018 |
| CN | 106459281 A | 8/2019 |
| CN | 108350113 B | 5/2021 |
| CN | 104628921 B | 12/2021 |
| RU | 2155776 C2 | 9/2000 |
| WO | 2005068519 A2 | 7/2005 |
| WO | 2007092753 A2 | 8/2007 |
| WO | 2007101053 A1 | 9/2007 |
| WO | 2007115093 A2 | 10/2007 |
| WO | 2011037971 A1 | 3/2011 |
| WO | 2014074622 A1 | 5/2014 |
| WO | 2014134028 A1 | 9/2014 |
| WO | 2015009484 A1 | 1/2015 |
| WO | 2015179628 A1 | 11/2015 |
| WO | 2020231667 A1 | 11/2020 |
| WO | 2021202190 A1 | 10/2021 |
| WO | 2021253032 A1 | 12/2021 |
| WO | 2023114773 A1 | 6/2023 |

OTHER PUBLICATIONS

XP093031232, DOI: 10.22063/poj.2016.1291, Retrieved from the Internet: URL:http://poj.ippi.ac.ir/article_1291_c355dfcae15c711f05f70524120eeeb2.pdf [retrieved on Mar. 13, 2023].

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Janzen, et al., "Diagnosing Long-Chain Branching in Polyethylene," Journal of Mol. Struct., 485/486, 1999, pp. 569-584.

M.L. Sentmanat, "Miniature Universal Testing Platform: From Extensional Melt Rheology to Solid-State Deformation Behavior," Rheol. Acta 43, 1999, pp. 657-669.

M.L. Sentmanat, et al., "Measuring the Transient Extensional Rheology of Polyethylene Melts Using the SER Universal Testing Platform," Journal of Rheology, vol. 49, 2005, pp. 585-606.

* cited by examiner

CONTROLLING LONG-CHAIN BRANCH CONTENT WITH DUAL ACTIVATOR-SUPPORTS

FIELD OF THE INVENTION

The present disclosure concerns metallocene-based catalyst systems containing activator-supports, and more particularly relates to methods for controlling the long chain branch (LCB) content of olefin-based polymers produced using the catalyst systems by adjusting the relative amount of different activator-supports in the catalyst systems.

BACKGROUND OF THE INVENTION

Metallocene-based catalyst systems can be used to polymerize olefins to produce olefin-based polymers, such as ethylene/α-olefin copolymers. In order to produce polymers with either lower or higher LCB content, an appropriate metallocene compound is selected for use in the catalyst system. However, substituting one metallocene compound for another in order to increase or decrease long chain branching can drastically affect many other polymer properties, such as melt index, molecular weight distribution, and short chain branching, among others. It would be beneficial to produce polymers having either higher or lower LCB content without having to resort to replacing the metallocene component of the catalyst system. Accordingly, it is to this end that the present disclosure is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, a polymerization process is disclosed, and in this aspect, the process can comprise (a) contacting a metallocene compound, an organoaluminum compound, a first (high LCB) activator-support, and a second (low LCB) activator-support to form a catalyst composition, (b) contacting the catalyst composition with ethylene and an optional olefin comonomer in a polymerization reactor system under polymerization conditions to produce an ethylene polymer having a long chain branch (LCB) content, and (c) controlling a relative amount of the first (high LCB) activator-support and the second (low LCB) activator-support in the catalyst composition in step (a) to adjust the LCB content of the ethylene polymer.

In another aspect of this invention, a catalyst composition is disclosed, and in this aspect, the catalyst composition can comprise (i) a first activator-support comprising a fluorided solid oxide, (ii) a second activator-support comprising a sulfated solid oxide, (iii) a metallocene compound, and (iv) an organoaluminum compound. For instance, the first activator-support can comprise fluorided silica-coated alumina, while the second activator-support can comprise sulfated bentonite, sulfated alumina, or a combination thereof.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

DEFINITIONS

Figure 1:
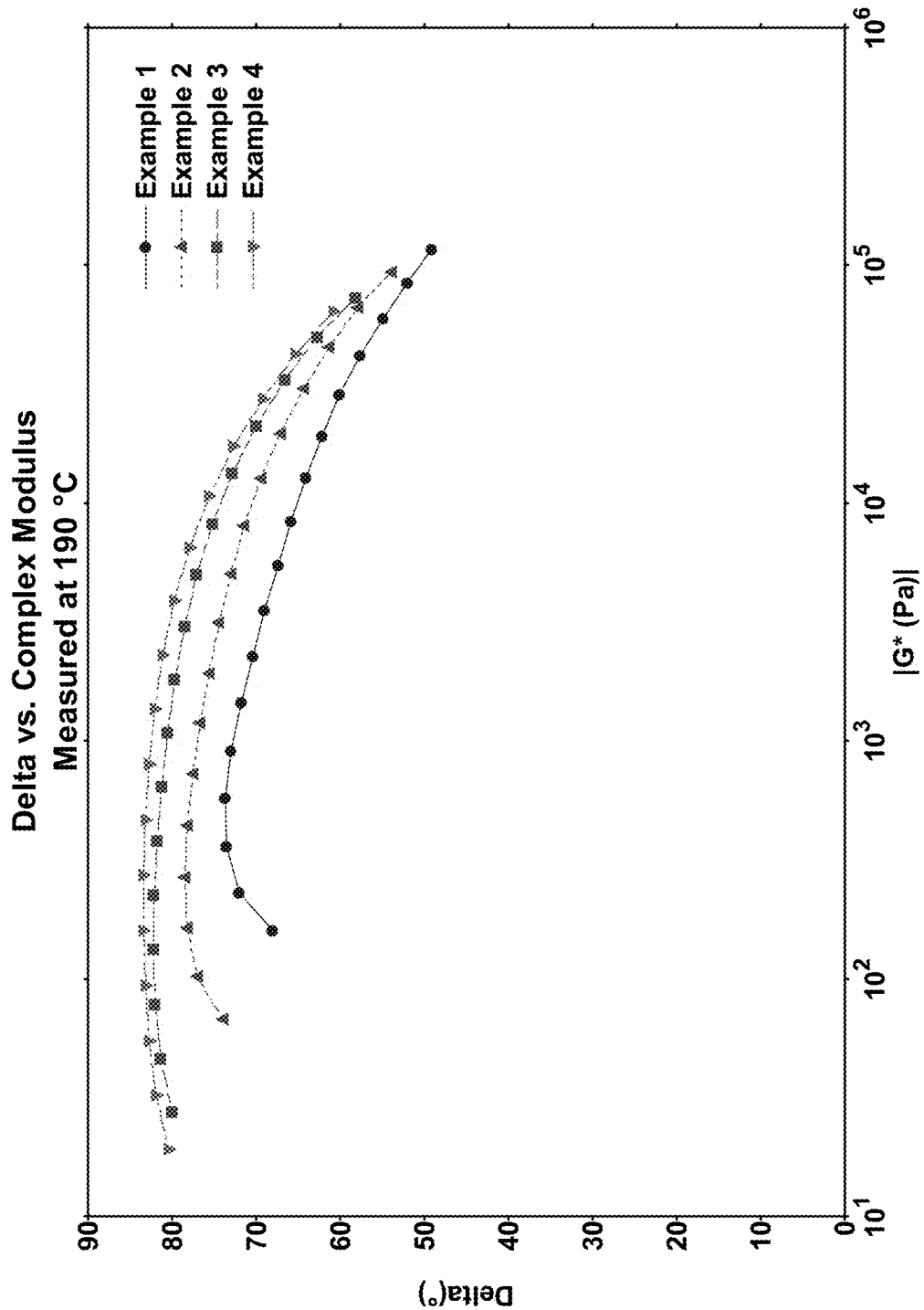
FIG. 1 is a plot of delta (phase angle in °) versus the logarithm of complex modulus (G* in Pa) for the polymers of Examples 1-4.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the compositions and processes described herein are contemplated with or without explicit description of the particular combination. Additionally, unless explicitly recited otherwise, any aspect and/or feature disclosed herein can be combined to describe inventive compositions and processes consistent with the present disclosure.

In this disclosure, while compositions and processes are often described in terms of "comprising" various components or steps, the compositions and processes also can "consist essentially of" or "consist of" the various components or steps, unless stated otherwise.

The terms "a," "an," and "the" are intended to include plural alternatives, e.g., at least one. For instance, the disclosure of "a polymerization reactor" or "a metallocene compound" is meant to encompass one, or combinations of more than one, polymerization reactor or metallocene compound, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "hydrocarbon" whenever used in this specification and claims refers to a compound containing only carbon and hydrogen. The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the organoaluminum compound(s), the metallocene compound(s), or the activator-support(s), after combining these components. Therefore, the terms "catalyst composition," "catalyst mixture," "catalyst system," and the like, encompasses the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contacting" is used herein to describe compositions and processes in which the components are contacted or combined together in any order, in any manner, and for any length of time, unless otherwise specified. For example, the components can be combined by blending or mixing, or by using any suitable technique.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the weight ratio of the metallocene compound (or compounds) to the activator-support (or activator-supports) in a catalyst composition can be in certain ranges. By a disclosure that the weight ratio can be in a range from 1:1 to 1:100,000, the intent is to recite that the weight ratio can be any ratio in the range and, for example, can include any range or combination of ranges from 1:1 to 1:100,000, such as from 1:10 to 1:10,000, from 1:20 to 1:1000, or from 1:50 to 1:500, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are catalyst compositions that comprise a metallocene compound, an organoaluminum compound, a first (high LCB) activator-support, and a second (low LCB) activator-support. Polymerization processes utilizing these catalyst compositions also are disclosed.

An advantageous and unexpected benefit of the methods/processes and catalyst compositions disclosed herein is the ability to control the long chain branch (LCB) content of polymers produced using the catalyst compositions, without having to resort to changing the metallocene component of the catalyst system. Instead, the LCB content of the polymer can be varied or adjusted simply by changing the relative amount of the first (high LCB) activator-support and the second (low LCB) activator-support in the catalyst composition.

The LCB content is an important property of ethylene-based polymers, such as LLDPE and HDPE. Based on the end-use application of the polymer and the fabrication process used to convert the polymer, it can be desirable to have either high or low LCBs. For instance, it can be beneficial to minimize the LCB content for thin-gauge film resins in order to improve the tear resistance and toughness properties of the film product. However, in other applications, higher levels of LCBs are needed for improved melt strength, die swell, and neck-in during polymer processing, such as blow molding or extrusion coating.

Catalyst Compositions and Polymerization Processes

Catalyst compositions are provided in an aspect of this invention, and one such catalyst composition can comprise (i) a first activator-support comprising a fluorided solid oxide, (ii) a second activator-support comprising a sulfated solid oxide, (iii) a metallocene compound, and (iv) an organoaluminum compound. In this disclosure, the first activator-support is often referred to as a "high LCB" activator-support, and the second activator-support is often referred to as a "low LCB" activator-support. As described herein, certain activator-supports can produce polymers having high (or higher) levels of LCBs, while other activator-supports can produce polymers having low (or lower) levels of LCBs, with the same other metallocene and organoaluminum components of the catalyst composition.

Suitable fluorided solid oxide and sulfated solid oxide activator-supports are disclosed, for instance, in U.S. Pat. Nos. 7,294,599, 7,601,665, 7,884,163, 8,309,485, 8,623,973, and 8,703,886, as well as methods of their preparation. Generally, the solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, bona, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from 5% by weight to 95% by weight. In one aspect, the silica content of these solid oxides can be from 10% by weight to 80% silica by weight, or from 20% by weight to 70% silica by weight. In another aspect, such materials can have silica contents ranging from 15% to 60% silica by weight, or from 25% to 50% silica by weight. The solid oxides contemplated herein can have any suitable surface area, pore volume, and particle size, as would be recognized by those of skill in the art.

The activator-support generally can contain from 1 wt. % to 30 wt. % of the electron-withdrawing anion (e.g., fluoride or sulfate) based on the weight of the activator-support. In particular aspects provided herein, the activator-support can contain from 2 to 20 wt. %, from 2 to 15 wt. %, from 2 to 10 wt. %, from 3 to 18 wt. %, from 3 to 15 wt. %, or from 3 to 10 wt. %, of the electron-withdrawing anion (e.g., fluoride or sulfate), based on the total weight of the activator-support.

Often, the first activator-support can comprise fluorided alumina, fluorided silica-alumina, fluorided silica-zirconia, fluorided silica-titania, fluorided silica-coated alumina, or fluorided-chlorided silica-coated alumina, and the like, as well as any mixture or combination thereof. Additionally or alternatively, the second activator-support can comprise sulfated alumina, sulfated silica-alumina, sulfated silica-zirconia, or sulfated silica-coated alumina, and the like, as well as any mixture or combination thereof.

In another aspect, a catalyst composition consistent with this invention can comprise (i) a first activator-support comprising fluorided silica-coated alumina, (ii) a second activator-support comprising sulfated bentonite and/or sulfated alumina, (iii) a metallocene compound, and (iv) an organoaluminum compound. Thus, the second activator-support can comprise sulfated bentonite; alternatively, the second activator-support can comprise sulfated alumina; or alternatively, the second activator-support can comprise sulfated bentonite and sulfated alumina.

Similar to sulfated solid oxides such as sulfated alumina, sulfated bentonite also is a suitable second activator-support or a suitable low LCB activator-support. The bentonite can have any surface area, pore volume, and particle size features that are appropriate for olefin-based polymerization processes, as would be recognized by those of skill in the art, and the sulfated bentonite can be prepared by any typical procedure, such as described in U.S. Pat. No. 2,470,872. Sulfated bentonite is an acidic clay, and often can be referred to as an acidic bentonite or acid-treated bentonite. Typically, sulfated bentonite is a sulfuric acid-washed bentonite (or montmorillonite), as described in U.S. Pat. No. 2,470,872. Suitable sulfated bentonites generally have residual acidity values (mg KOH/g at the phenolphthalein endpoint) of from 3 to 14, and approximately 3-6 wt. % Ca, 28-32 wt. % Si, 0.08-0.14 wt. % Na, 0.1-0.3 wt. % Sr, 2.8-4.8 wt. % S, and 0.5-0.75 wt. % Ti (via XRF).

Consistent with aspects of this invention, the catalyst compositions can contain one or more than one metallocene compound and one or more than one organoaluminum compound. Further, the catalyst compositions can be prepared by contacting the components of the catalyst composition (the first activator-support, the second activator-support, the metallocene compound, and the organoaluminum compound) in any order or sequence. Often, the organoaluminum compound, the first "high LCB" activator-support, and the second "low LCB" activator-support are contacted or combined first for a suitable period of time, followed by contacting the metallocene compound to form the catalyst composition. However, the organoaluminum compound, the first "high LCB" activator-support, the second "low LCB" activator-support, and the metallocene compound also can be contacted or combined substantially contemporaneously to form the catalyst composition.

In one aspect, a first polymerization process consistent with this invention can comprise contacting a catalyst composition (any catalyst composition disclosed herein, containing the first activator-support, the second activator-support, the metallocene compound, and the organoaluminum compound) with ethylene and an optional olefin comonomer in a polymerization reactor system under polymerization conditions to produce an ethylene polymer.

In another aspect, a second polymerization process consistent with this invention (which also can be referred to as a method of controlling LCB content) can comprise (a) contacting a metallocene compound, an organoaluminum compound, a first (high LCB) activator-support, and a second (low LCB) activator-support to form a catalyst composition, (b) contacting the catalyst composition with ethylene and an optional olefin comonomer in a polymerization reactor system under polymerization conditions to produce an ethylene polymer having a long chain branch (LCB) content, and (c) controlling a relative amount of the first (high LCB) activator-support and the second (low LCB) activator-support in the catalyst composition in step (a) to adjust the LCB content of the ethylene polymer. Thus, in step (c), the LCB content of the ethylene polymer produced by the process can be controlled or varied by controlling or varying the relative amount of the high LCB activator-support and the low LCB activator-support used in the catalyst composition.

Step (a) of this second polymerization process can be performed by pre-contacting the organoaluminum compound, the first (high LCB) activator-support, and the second (low LCB) activator-support for a suitable period of time, and then contacting the metallocene compound to form the catalyst composition. However, step (a) is not limited thereto, and in some aspects, step (a) can comprise contacting the organoaluminum compound, the first (high LCB) activator-support, the second (low LCB) activator-support, and the metallocene compound substantially contemporaneously to form the catalyst composition. Also, while not being limited thereto, the catalyst composition in step (a) can be conveniently prepared by feeding the high LCB activator-support and the low LCB activator-support separately (e.g., in separate feed streams) to a vessel and mixing with the metallocene compound and the organoaluminum compound to form the catalyst composition, which is then fed to a reactor in the polymerization reactor system.

In an aspect of the second polymerization process, the first (high LCB) activator-support can comprise a fluorided solid oxide, while the second (low LCB) activator-support can comprise a sulfated solid oxide. Any suitable fluorided solid oxides and sulfated solid oxides or any fluorided solid oxides and sulfated solid oxides disclosed herein can be used. In another aspect, the first (high LCB) activator-support can comprise fluorided silica-coated alumina, and the second (low LCB) activator-support can comprise sulfated bentonite and/or sulfated alumina. Thus, the second activator-support can comprise sulfated bentonite; alternatively, the second activator-support can comprise sulfated alumina; or alternatively, the second activator-support can comprise sulfated bentonite and sulfated alumina.

Optionally, the first and second polymerization processes can further comprise the steps of determining (or measuring) the LCB content of the ethylene polymer, and adjusting the relative amount of the first (high LCB) activator-support and the second (low LCB) activator-support in the catalyst composition based on the difference between the measured LCB content and a target LCB content. Thus, for example, if the LCB content of the ethylene polymer is lower than the desired target LCB content, the ratio of the amount of the high LCB activator-support to the low LCB activator-support in the catalyst composition can be increased, thereby increasing the LCB content of the ethylene polymer.

Any suitable weight ratio of the first activator-support to the second activator-support in the catalyst compositions and polymerization processes can be used, depending upon the desired amount of LCB content. Typical weight ratios of the first activator support to the second activator support can include from 100:1 to 1:100, from 10:1 to 1:10, from 5:1 to 1:5, from 2:1 to 1:2, or from 1.5:1 to 1:1.5, and the like.

In both the first polymerization process and the second polymerization process, the LCB content of the ethylene polymer is not particularly limited, and often is targeted based on fabrication process and end product performance considerations in the end-use application of the ethylene polymer. Nonetheless, the ethylene polymer generally can contain from 1 to 150 LCBs per million total carbon atoms, such as from 1 to 10 LCBs, from 10 to 150 LCBs, or from 15 to 100 LCBs, per million total carbon atoms. This LCB content is determined using the Janzen-Colby method.

Generally, in the catalyst compositions and polymerization processes disclosed herein, the molar ratio of the organoaluminum compound to the metallocene compound can be in a range from 1:1 to 1000:1, such as from 1:1 to 100:1, from 2:1 to 200:1, or from 5:1 to 100:1, although not limited thereto. If more than one organoaluminum compound and/or more than one metallocene compound are employed, this ratio is based on the total moles of each respective type of component.

The weight ratio of the metallocene compound to the activator-supports can range from 1:1 to 1:100,000 in one aspect, from 1:10 to 1:10,000 in another aspect, from 1:20 to 1:1000 in yet another aspect, and from 1:50 to 1:500 in still another aspect. Also, the weight ratio of the activator-supports to the organoaluminum compound can range from 100:1 to 1:100 in one aspect, from 10:1 to 1:10 in another aspect, from 5:1 to 1:5 in yet another aspect, and from 2:1 to 1:2 in still another aspect. If two or more of any of these components are present, then these ratios are based on the total weight of each respective type of component.

In some aspects, the catalyst compositions used in the polymerization processes are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity in the absence of these additional materials. For example, a catalyst composition of the present invention can consist essentially of a metallocene compound, an organoaluminum compound, a first (high LCB) activator-support, and a second (low LCB) activator-support, wherein no other materials are present in the catalyst composition which would increase/decrease the activity of the catalyst composition by more than 10% from the catalyst activity of the catalyst composition in the absence of said materials.

Referring to both the first and second polymerization processes, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 100° C., or from 75° C. to 95° C.

Suitable pressures will also vary according to the reactor and polymerization type. The pressure for liquid phase polymerizations in a loop reactor is typically less than 1000 psig (6.9 MPa). Pressure for gas phase polymerization is usually from 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, stereoregularity, crack growth, long chain branching, and rheological measurements.

Consistent with aspects of this invention, the olefin monomer used in the polymerization process is ethylene, and if used, the comonomer can comprise a $C_3$-$C_{20}$ alpha-olefin; alternatively, a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene. Thus, in an aspect, the catalyst composition can be contacted with ethylene and an olefin comonomer comprising a $C_3$-$C_{10}$ alpha-olefin to produce the ethylene polymer, while in another aspect, the catalyst composition can be contacted with ethylene and an olefin comonomer comprising 1-butene, 1-hexene, 1-octene, or a mixture thereof, to produce the ethylene polymer.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

Aspects contemplated herein also are directed to, and encompass, the ethylene polymers produced by any of the polymerization processes disclosed herein. Articles of manufacture can be formed from, and/or can comprise, the polymers produced in accordance with the polymerization processes described herein.

Metallocene Compounds

Metallocene-based catalyst compositions consistent with this invention can contain a bridged metallocene compound and/or an unbridged metallocene compound. Metallocene-based catalyst compositions consistent with this invention also can contain two or more bridged metallocene compounds, two or more unbridged metallocene compounds, or at least one bridged metallocene compound and at least one unbridged metallocene compound. The metallocene compound can comprise, for example, a transition metal (one or more than one) from Groups IIIB-VIIIB of the Periodic Table of the Elements. In one aspect, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in other aspects. In further aspects, the metallocene compound can comprise titanium, or zirconium, or hafnium, either singly or in combination.

In some aspects of this invention, the metallocene compound can comprise a bridged metallocene compound, e.g., with titanium, zirconium, or hafnium, such as a bridged zirconium or hafnium based metallocene compound with a fluorenyl group, or a bridged zirconium or hafnium based metallocene compound with a cyclopentadienyl group and a fluorenyl group. Such bridged metallocenes, in some aspects, can contain an alkenyl substituent (e.g., a terminal alkenyl group) on the bridging group and/or on a cyclopentadienyl-type group (e.g., a cyclopentadienyl group or a fluorenyl group). In another aspect, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; alternatively, a bridged hafnium based metallocene compound with a fluorenyl group, and an aryl group on the bridging group; or alternatively, a bridged zirconium or hafnium based metallocene compound with a cyclopentadienyl group and fluorenyl group, and an aryl group on the bridging group. In these and other aspects, the aryl group on the bridging group can be a phenyl group. Optionally, these bridged metallocenes can contain an alkenyl substituent (e.g., a terminal alkenyl group) on the bridging group and/or on a cyclopentadienyl-type group.

In some aspects, the metallocene compound can comprise a bridged zirconium or hafnium based metallocene compound with two cyclopentadienyl groups, two indenyl groups, or a cyclopentadienyl and an indenyl group (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a single carbon atom or a single silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems and polymerization processes consistent with aspects of the present invention are described in U.S. Pat. Nos. 7,026,494, 7,041,617, 7,226, 886, 7,312,283, 7,517,939, and 7,619,047.

In some aspects of this invention, the metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems and polymerization processes consistent with aspects of the present invention are described in U.S. Pat. Nos. 7,199,073, 7,226,886, 7,312,283, and 7,619,047.

Moreover, the metallocene compound can comprise an unbridged dinuclear metallocene such as those described in U.S. Pat. Nos. 7,919,639 and 8,080,681. The metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

Aspects of this invention also are directed to catalyst compositions and polymerization processes in which two or more metallocene compounds are employed, e.g., a dual metallocene catalyst composition. Independently, each respective metallocene compound can be any bridged metallocene compound disclosed herein or any unbridged metallocene compound disclosed herein. If two metallocene compounds are present in the catalyst composition, the weight ratio of the first compound to the second compound (first:second) typical can range from 50:1 to 1:50, from 10:1 to 1:10, from 5:1 to 1:5, from 2:1 to 1:2, from 1.5:1 to 1:1.5, or from 1.2:1 to 1:1.2.

In a particular aspect of the invention, the metallocene compound is (1) rac-ethylene-bis(1-indenyl) zirconium dichloride; (2) methyl(buten-3-yl)methylidene($\eta$5-cyclopentadien-1-ylidene)($\eta$5-2,7-di-tert-butylfluoren-9-ylidene) zirconium dichloride, (3) diphenylmethylidene[$\eta$5-[3-(pent-4-enyl)cyclopentadien-1-ylidene)($\eta$5-(2,7-di-tert-butylfluoren-9-ylidene)] hafnium dichloride; (4) (n-butylcyclopentadienyl)(1-allylindenyl)zirconium dichloride; (5) rac-dimethylsilylbis(1-indenyl)zirconium dichloride; or (6) 1-ethylpropydene[($\eta$5-cyclopentadien-1-ylidene)($\eta$5-(3-propy dene]] zirconium dichloride. As discussed herein, the catalyst composition can contain one of these metallocene compounds, or two of more of these metallocene compounds at any suitable relative amount.

Organoaluminum Compounds

The present invention encompasses various catalyst compositions containing an organoaluminum compound. As disclosed herein, more than one organoaluminum compound can be used in the catalyst compositions disclosed herein.

In some aspects, any suitable organoaluminum compound can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. In other aspects, suitable organoaluminum compounds can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one aspect, each $X^7$ independently can be any hydrocarbyl having from 1 to 18 carbon atoms, or from 1 to 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain aspect of the present invention. According to another aspect of the present invention, each $X^8$ independently can be an alkoxide or an aryloxide, any one of which has from 1 to 18 carbon atoms, a halide, or a hydride. In yet another aspect of the present invention, each $X^8$ can be selected independently from fluorine and chlorine. In the formula, $Al(X^7)_m(X^8)_{3-m}$, m can be a number from 1 to 3 (inclusive) and typically, m can be 3. The value of m is not restricted to be an integer; therefore, this formula can include sesquihalide compounds or other organoaluminum cluster compounds.

Examples of organoaluminum compounds that can be used in the catalyst compositions and polymerization processes in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

The metallocene compounds used in the examples are abbreviated as follows: MET-A is dimethylsilylbis(1-indenyl)zirconium dichloride; MET-B is 1-ethylpropylidene [($\eta$5-cyclopentadien-1-ylidene)($\eta$5-(3-propyl)inden-1-ylidene]]zirconium dichloride; and MET-C is methyl(buten-3-yl) methylidene ($\eta$5-cyclopentadienyl) ($\eta$5-2,7-di-tert-butylfluoren-9-ylidene) zirconium dichloride. MET-A is generally believed to produce polymers with high amounts of LCBs, while MET-B is generally believe to produce relatively low molecular weight polymer with minimal LCB content. MET-C also is generally believed to produce polymers with low amounts of LCBs. The preparation of the activator-supports used in the examples and their abbreviations are provided below.

AS-1 was a fluorided silica-coated alumina prepared by first dissolving ammonium bifluoride (1.5 g) in 50 mL of methanol. Then, 15 g of silica-coated alumina (40 wt. % alumina, a surface area of 450 m²/g, a pore volume of 1.3 mL/g, and an average particle size of 35 microns) was impregnated with the methanol solution with stirring to create a consistency of damp sand. After drying overnight under vacuum at 100° C., the dry powder was passed through a 35 mesh sieve to break up any lumps or chunks. Calcining was performed at 600° C. by fluidizing the powder in dry air for 3 hr, followed by cooling to room temperature while being fluidized under nitrogen.

AS-2 was a sulfated bentonite support (Delta Industries Z130, average particle size of 60 microns, also available under the name F-30X, residual acidity of 3-6 mg KOH/g at the phenolphthalein endpoint, approximately 5.4 wt. % Ca, 29.2 wt. % Si, 0.08 wt. % Na, 0.27 wt. % Sr, 4.1 wt. % S, and 0.64 wt. % Ti via XRF). The base material was heat treated by placing 21.2 g of the support in a thin layer in an aluminum pan, which was then placed in a furnace under dry nitrogen at 280° C. for 1.5 hr. After removing from the furnace, the heat treated AS-2 was quickly placed into a bottle under nitrogen and capped.

AS-3 was a fluorided silica-coated alumina prepared by first mixing 400 mL of water and 100 g of silica-coated alumina (40 wt. % alumina, a surface area of 450 m²/g, a pore volume of 1.3 mL/g, and an average particle size of 35 microns). A solution of concentrated hydrofluoric acid (5 g HF) was mixed into the slurry, and the resulting slurry was then spray dried to a dry flowable powder. Calcining was performed at 600° C. by fluidizing the fluorided silica-coated alumina (4.75 wt. % fluoride) in dry nitrogen for 3 hr, followed by cooling to room temperature while still being fluidized under nitrogen.

AS-4 was a sulfated alumina prepare by first calcining an alumina (a surface area of 300 m²/g, a pore volume of 1.3 mL/g, and an average particle size of 100 microns) in air at 600° C. for 15 min and then cooling to ambient temperature. Next, 100 g of the alumina were impregnated with 300 mL of water into which 15 g of concentrated sulfuric acid had been dissolved. The resulting damp powder was then dried overnight under vacuum at 100° C. Calcining was performed at 600° C. by fluidizing the sulfated alumina (14.7 wt. % sulfate) in dry nitrogen for 3 hr, followed by cooling to room temperature while still being fluidized under nitrogen.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm³) on a compression molded sample, cooled at 15° C. per minute, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three (3) Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 0.5-1.0 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

The long chain branches (LCBs) per 1,000,000 total carbon atoms of the overall polymer were calculated using the method of Janzen and Colby (*J. Mol. Struct.*, 485/486, 569-584 (1999), from values of zero shear viscosity ($\eta_0$) determined from the Carreau-Yasuda model described hereinabove, and values of Mw obtained using the GPC procedure described hereinabove.

Extensional viscosity was measured on a rotational rheometer (Physica MCR-500, Anton Paar) using the extensional viscosity fixture, a Sentimanat Extensional Rheometer (model SER-3 universal testing platform, Xpansion Instruments). The SER attachment makes it possible to easily measure the transient extensional viscosity as a function of time.

Test samples were prepared via compression molding at 182° C. The pellets samples were allowed to melt at a relatively low pressure for 1 min and then subjected to a high molding pressure for additional 2 min. Then, the hot press was turned off for slow cooling. The cooled plaque was retrieved from the press on the following day. Rectangular strips with dimensions of 12.77×18 mm were cut out of the molded plaque, and the thickness of the sample was measured.

The SER testing platform has two drums that rotate in the opposing direction (M. L. Sentmanat, "Miniature universal testing platform: from extensional melt rheology to solid-state deformation behavior," *Rheol. Acta* 43, 657 (2004); M. L. Sentmanat, B. N. Wang, G. H. McKinley, "Measuring the transient extensional rheology of polyethylene melts using the SER universal testing platform," *J. Rheol.* 49, 585 (2005)). The rectangular samples were tested by clipping onto the two posts of the fixture, then closing the oven to heat to 150° C., where it was annealed at 150° C. for 30 sec to allow the temperature to reach equilibrium. The sample was then stretched at constant Hencky strain rates $\dot{\varepsilon}_H$ between 0.03 and 25 s$^{-1}$ at 150° C. The torque M resulting from the force of tangential stretching of the sample between the rotating drums F was recorded by the rotational rheometer:

$$M(t) = 2RF(t) \quad (A)$$

where the radius of drums R=5.155 mm. The Hencky strain rate $\dot{\varepsilon}_H$ at constant drum rotating speed $\Omega$ is $$\dot{\varepsilon}_H = \frac{2\Omega R}{L} \quad (B)$$

where the length of the stretching zone between the rotating drums L=12.72 mm. The transient extensional viscosity $\eta_E^+(t)$ was obtained for given Hencky strain rate as $$\eta_E^+(t) = \frac{\sigma_E(t)}{\dot{\varepsilon}_E} = \frac{F(t)}{A(t,T)\dot{\varepsilon}_E} \quad (C)$$

where A(t,T) is the cross-sectional area of the sample which thermally expands upon melting and exponentially decreases with stretching:

$$A(t, T) = A_o \exp(-\dot{\varepsilon}_E t) \left(\frac{\rho_s}{\rho(T)}\right)^{2/3} \quad (D)$$

where $A_0$ and $\rho_s$ are the initial cross-sectional area and the density of the sample measured at room temperature in solid state. The melt density $\rho(T)$ is given by $\rho(T)=\rho_0-\Delta\rho(T-273.15)T$. Therefore, the transient extensional viscosity $\eta_E^+(t)$ as a function of time was calculated at each extension rate as $$\eta_E^+(t) = \frac{M - M_{offset}}{2R\dot{\varepsilon}_E A_0 \exp(-\dot{\varepsilon}_E t)} \left(\frac{\rho(T)}{\rho_s}\right)^{2/3} \quad (E)$$

where $M_{offset}$ is a pre-set torque which can be applied prior to the actual test. To compare the extensional response to the linear viscoelastic (LVE) limit, the LVE envelop $3\eta^+(t)$ was obtained from the relaxation spectrum of the dynamic frequency sweep data measured at 150° C. as $$\eta^+(t) = \sum_{i=1}^{N} G_i \lambda_i [1 - \exp(-t/\lambda_i)] \quad (F)$$

where the set of $G_i$ and $\lambda_i$ define the relaxation spectrum of the material.

In general, it has been observed that when long chain branching exists in the polymer, the transient extensional viscosity deviates from the LVE drastically by increasing slope just before breakage. This behavior is called the strain hardening. In contrast, for linear resins the transient extensional viscosity growth curves show no strain hardening by continuing to follow the LVE envelop ($3\eta^+(t)$) according to the Trouton's rule.

Examples 1-10

The polymerization experiments of Examples 1-10 are summarized in Table I-III and were conducted for from 17 to 39 min (to produce ~210-260 g polymer) in a one-gallon stainless-steel autoclave reactor containing isobutane as diluent. First, the reactor was charged with the activator-support(s), followed by TIBA (triisobutylaluminum, 1 M in hexane). A toluene solution (1 mg/mL) of the desired metallocene(s) was then added and the reactor was sealed and charged with 2 L of isobutane. The reactor contents were heated to the target polymerization temperature of 83° C. with stirring (~1000 rpm). When the reactor contents reached 6° C. below the target temperature, 1-hexene was added as the reactor was charged with ethylene to the target pressure (325 psig). No hydrogen was added. Ethylene was fed on demand to maintain the target pressure. The reactor was maintained at the target temperature throughout the experiment by an automated heating-cooling system. After venting of the reactor, purging, and cooling, the resulting polymer product was dried under reduced pressure.

Table I summarizes the catalyst compositions of Examples 1-7, and Table II summarizes the polymerization reaction conditions, amount of polymer product, catalyst activity (grams of polymer per gram of support per hour), and the melt index of the polymer produced. Table III summarizes the catalyst compositions of Examples 1-4 and 8-10 (160 mg of activator-support and 0.4 mL of 1 M TIBA), and the melt index, Mn, and ratio of Mw/Mn for the polymer produced. Table II and Table III demonstrate that, at a given metallocene ratio, the melt index can be changed by altering the relative amount of AS-1 versus AS-2 in the catalyst composition. Beneficially, this can be done while maintaining a generally consistent Mn and without significant broadening of the molecular weight distribution (ratio of Mw/Mn).

Figure 2:
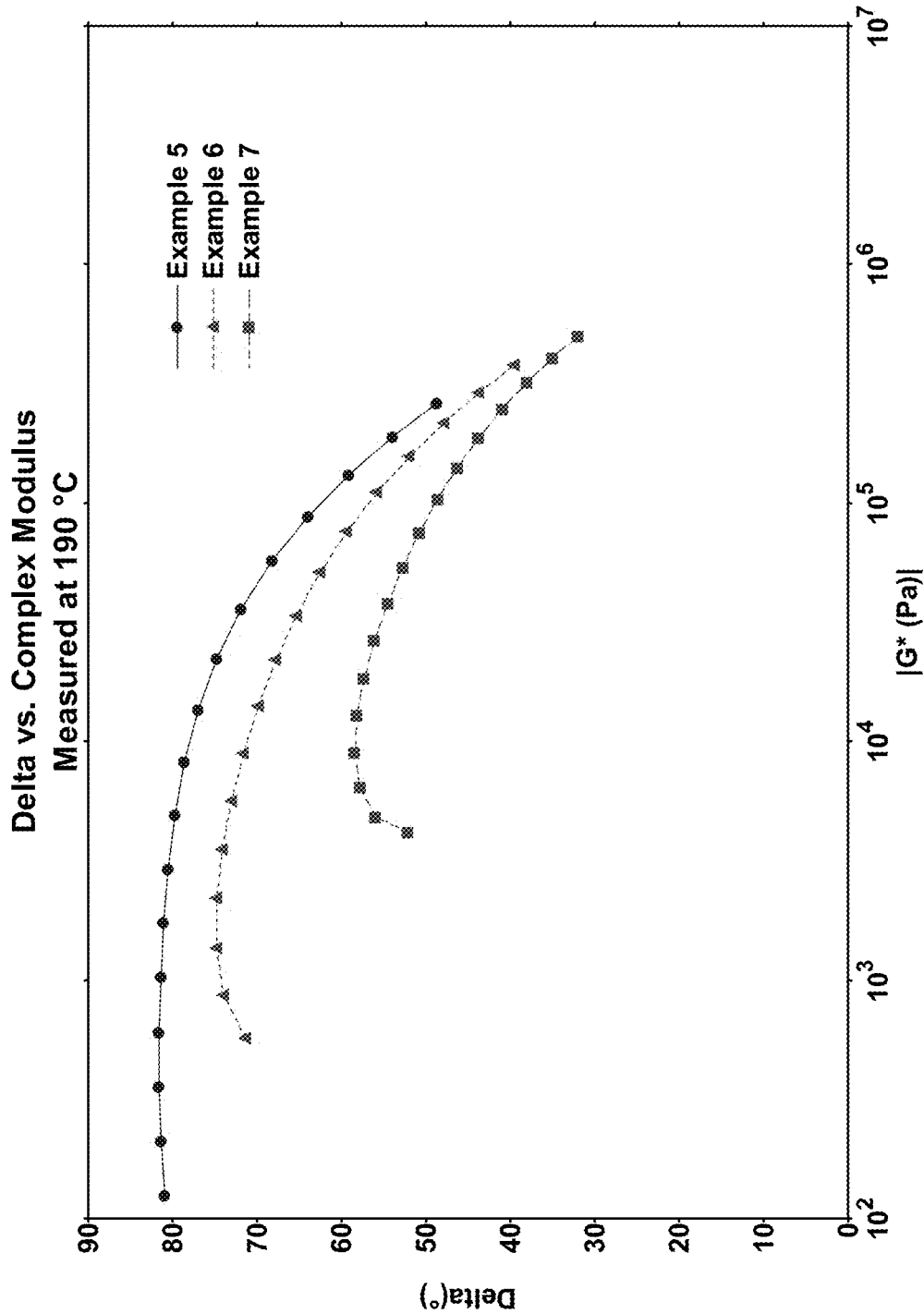
FIG. 2 is a plot of delta versus the logarithm of complex modulus for the polymers of Examples 5-7.

FIG. 1 and FIG. 2 illustrate van Gurp-Palmen plots (phase angle vs. the absolute value of the complex modulus) for Examples 1-4 (dual metallocene) and Examples 5-7 (single metallocene), respectively, and these examples used AS-1 (fluorided silica-coated alumina) and/or AS-2 (sulfated bentonite) as the activator-support(s) in the catalyst composition. Resins lacking LCBs typically approach ~90° at low complex modulus. For resins containing significant LCBs, a marked deviation from 90° is observed at low modulus. As shown in FIG. 2, polymers produced with MET-A demonstrated a clear downturn in delta at low modulus. The magnitude of the downturn was greatest for the polymer produced using 100% AS-1 (Example 7), while essentially no downturn was observed for the polymer produced using 100% AS-2 (Example 5). These results demonstrate the presence of significant LCBs in the polymer produced using 100% AS-1, and in contrast, low LCBs in the polymer produced using 100% AS-2. Importantly, the polymer produced using a 50:50 mixture of AS-1 and AS-2 (Example 6) showed a downturn that is in between that exhibited by Example 5 and Example 7. Similar results were obtained using the dual metallocene catalyst system for Examples 1-4, as shown in FIG. 1.

Figure 3:
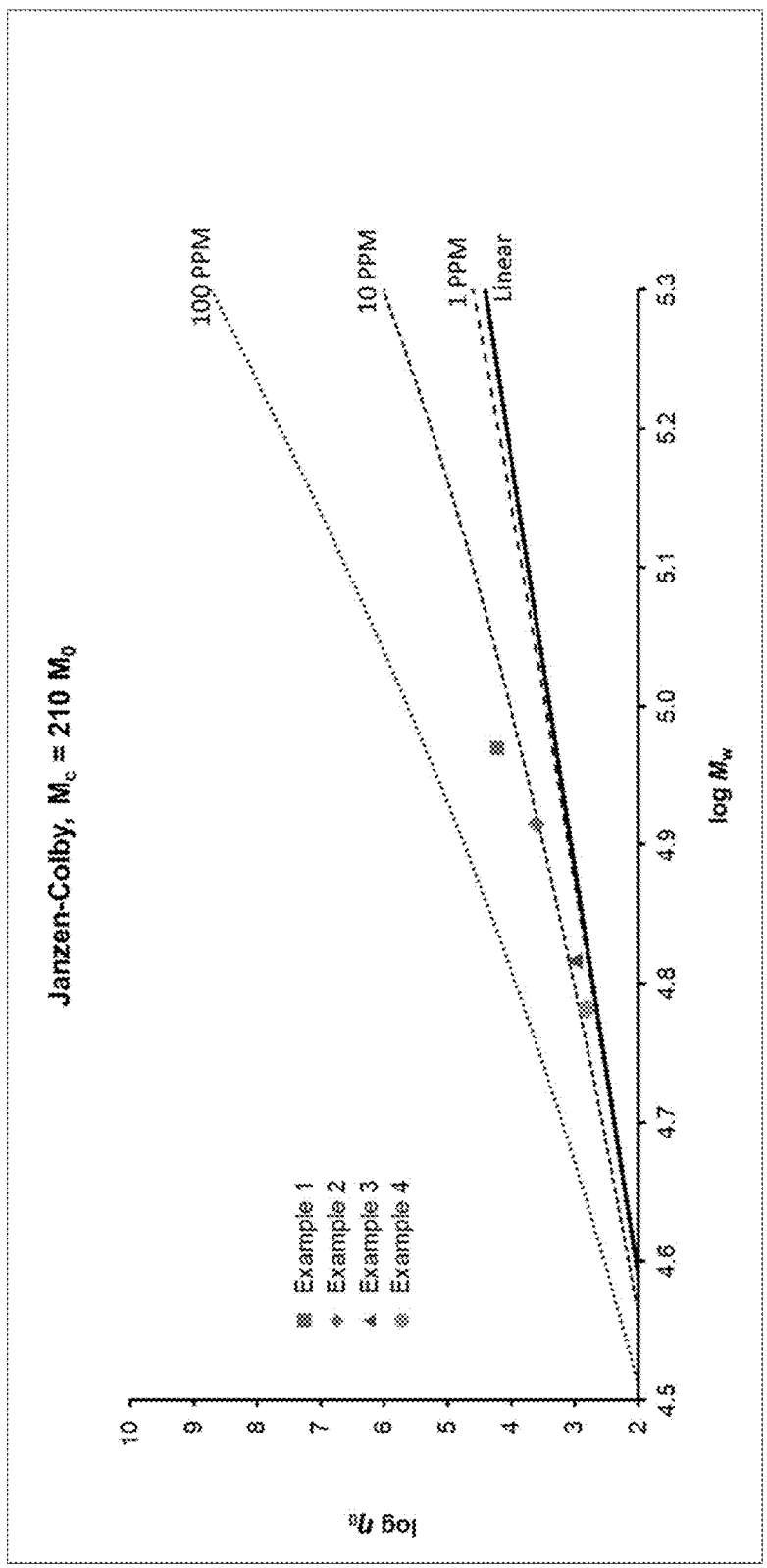
FIG. 3 is a Janzen-Colby logarithmic plot of the zero-shear viscosity ($\eta_0$ in Pa-sec) versus the weight-average molecular weight (Mw in g/mol) for the polymers of Examples 1-4.
Figure 4:
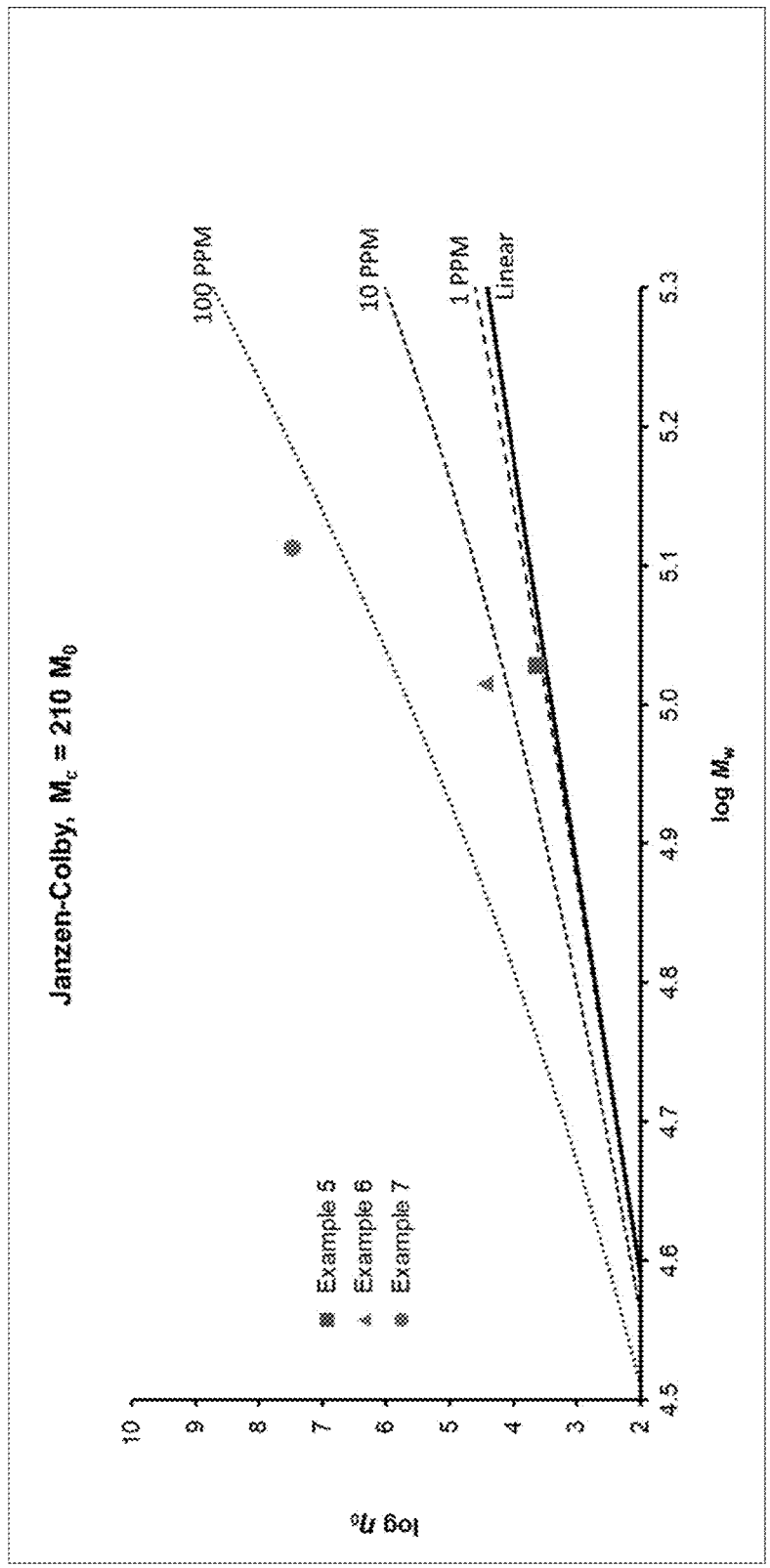
FIG. 4 is a Janzen-Colby logarithmic plot of the zero-shear viscosity versus the weight-average molecular weight for the polymers of Examples 5-7.

FIG. 3 and FIG. 4 are Janzen-Colby plots for Examples 1-4 (dual metallocene) and Examples 5-7 (single metallocene), respectively, using AS-1 (fluorided silica-coated alumina) and/or AS-2 (sulfated bentonite) as the activator-support(s) in the catalyst composition. LCB content increased in FIG. 3 for Examples 1-4 as the relative amount of AS-1 in the catalyst composition was increased (from approximately 7 LCBs to 18 LCBs per million total carbon atoms). Likewise, FIG. 4 showed the same trend for Examples 5-7, and with the LCB content ranging from approximately 2 LCB (AS-2) to >100 LCBs (AS-1) per million total carbon atoms. Thus, for example, if the LCB content of the ethylene polymer is lower than desired, then more AS-1 (high LCB activator-support) relative to AS-2 (low LCB activator-support) can be added to form the catalyst composition, thereby increasing the LCB content of the ethylene polymer.

Figure 5:
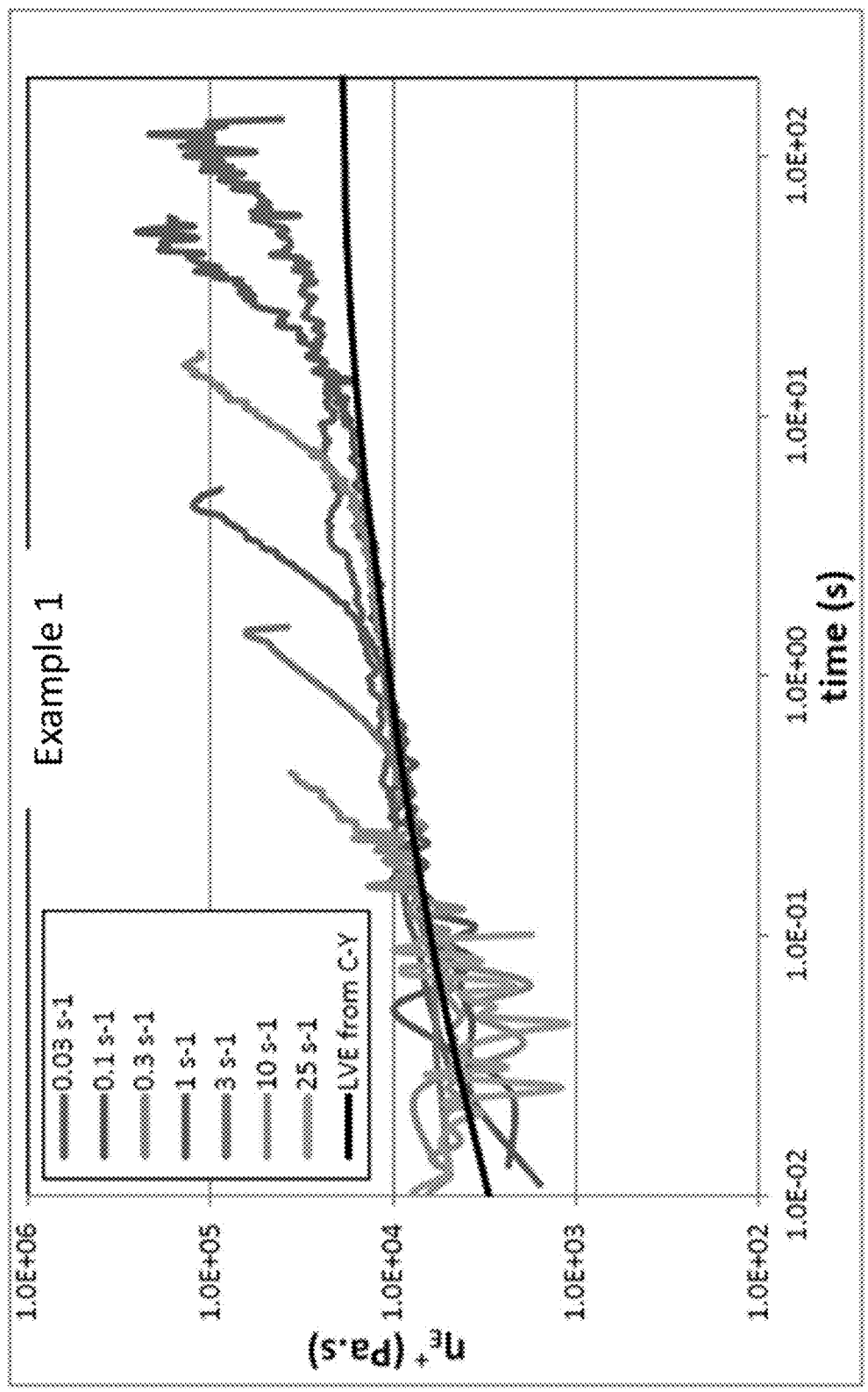
FIG. 5 is a logarithmic extensional viscosity plot (extensional viscosity versus shear rate) at 150° C. for the polymer of Example 1.
Figure 6:
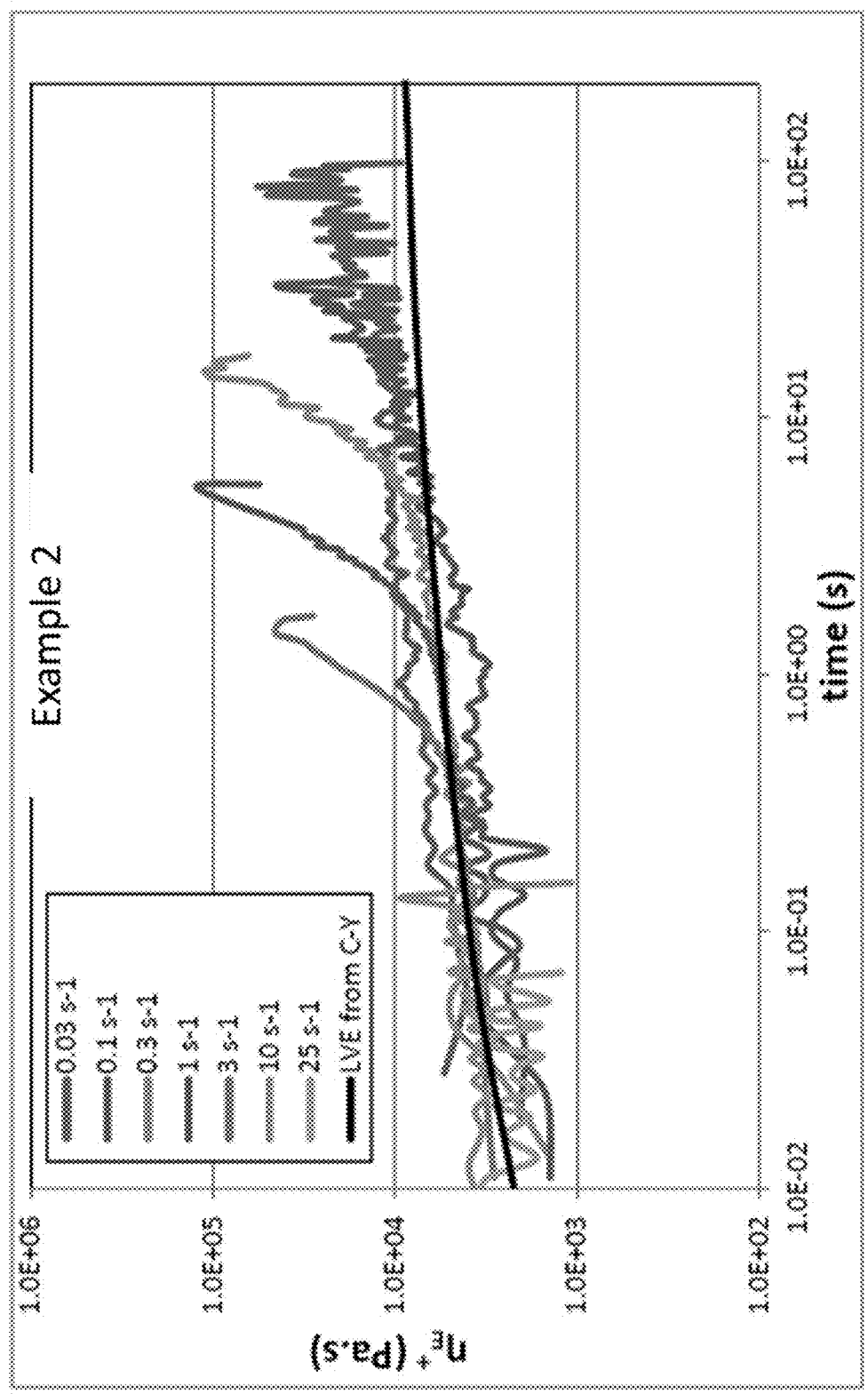
FIG. 6 is a logarithmic extensional viscosity plot for the polymer of Example 2.

Extensional rheology also was used as a means to determine the presence of LCBs in the polymer. For a Newtonian fluid, the ratio of extensional viscosity will be equal to 3 times the shear viscosity; the ratio of $\eta_E/3\eta$ will be equal to 1 for a Newtonian fluid. For molten polymers with strain hardening due to the presence of LCBs, the ratio of $\eta_E/3\eta$ will be greater than 1. FIG. 5 and FIG. 6 are extensional viscosity plots for the polymer of Example 1 and Example 2, respectively, determined using SER. These plots illustrate the dependence of strain hardening on the amount of AS-1 used to produce the polymer.

Collectively, these results show that the two different activator-supports yield catalyst systems which produce different amounts of LCBs, and that blends of the activator-supports yield catalysts which produce polymers with LCB content intermediate to the amount of LCBs produced using either activator-support independently. Therefore, by adjusting the relative amount of the two activator-supports used in the catalyst composition, the amount of LCBs introduced into the polymer can be changed or adjusted.

Examples 11-12

For Example 11, the catalyst composition was prepared by combining 0.5 mg of MET-C (1 mg/mL of toluene) with 100 mg of AS-3, and then adding 0.4 mmol of TIBA (a solution in hexanes or heptanes). For Example 12, the catalyst composition was prepared by combining 2 mg of MET-C (2 mg/mL of toluene) with 100 mg of AS-4, and then adding 0.6 mmol of TIBA (a solution in hexanes or heptanes).

Polymerization experiments of Examples 11-12 were performed similarly to that of Examples 1-10, except that the polymerization reaction time was 30 min, the target polymerization temperature was 90° C., no 1-hexene was used, and the ethylene pressure was 390 psig for Example 11 and 420 psig for Example 12.

Table IV summarizes the results of Example 11-12. While MET-C produces minimal amounts of LCBs, the polymer of Example 11 (produced using AS-3, fluorided silica-coated alumina) had over twice the LCB content as that of the polymer of Example 12 (produced using AS-4, sulfated alumina), at almost identical Mw values. Thus, similar to Examples 1-10, Examples 11-12 show that the two different activator-supports yield catalyst systems which produce different amounts of LCBs, and by adjusting the relative amount of the two activator-supports used in the catalyst composition, the amount of LCBs introduced into the polymer can be changed or adjusted.

TABLE I

Examples 1-7.

| Example | MET-A (mg) | MET-B (mg) | AS-1 (mg) | AS-2 (mg) | TIBA (mL) |
|---|---|---|---|---|---|
| 1 | 0.6 | 0.4 | 160 | 0 | 0.4 |
| 2 | 0.6 | 0.4 | 118 | 39 | 0.4 |
| 3 | 0.6 | 0.4 | 82 | 82 | 0.4 |
| 4 | 0.6 | 0.4 | 41 | 123 | 0.4 |
| 5 | 1 | 0 | 0 | 163 | 0.4 |

TABLE I-continued

Examples 1-7.

| Example | MET-A (mg) | MET-B (mg) | AS-1 (mg) | AS-2 (mg) | TIBA (mL) |
|---|---|---|---|---|---|
| 6 | 1 | 0 | 80 | 80 | 0.4 |
| 7 | 1 | 0 | 159 | 0 | 0.4 |

TABLE II

Examples 1-7.

| Example | 1-hexene (g) | Temp (° C.) | Pressure (psig) | Polymer (g) | Support Activity (g/g/hr) | MI (g/10 min) |
|---|---|---|---|---|---|---|
| 1 | 12 | 83 | 325 | 252 | 2461 | 3.2 |
| 2 | 12 | 83 | 325 | 247 | 3131 | 6.1 |
| 3 | 12 | 83 | 325 | 257 | 3710 | 10.5 |
| 4 | 12 | 83 | 325 | 249 | 4148 | 11.9 |
| 5 | 12 | 83 | 325 | 232 | 2855 | 1.8 |
| 6 | 12 | 83 | 325 | 252 | 3199 | 0.5 |
| 7 | 12 | 83 | 325 | 247 | 3010 | 0.1 |

TABLE III

Examples 1-4 and 8-10.

| Example | MET-A (mg) | MET-B (mg) | AS-1 (%) | MI (g/10 min) | Mw/Mn | Mn (kg/mol) |
|---|---|---|---|---|---|---|
| 1 | 0.6 | 0.4 | 100 | 3.2 | 7.3 | 12.85 |
| 2 | 0.6 | 0.4 | 75 | 6.1 | 4.0 | 20.39 |
| 3 | 0.6 | 0.4 | 50 | 10.5 | 4.0 | 16.37 |
| 4 | 0.6 | 0.4 | 25 | 11.9 | 3.3 | 18.33 |
| 8 | 0.3 | 0.7 | 25 | 109.7 | 3.0 | 12.29 |
| 9 | 0.3 | 0.7 | 50 | 85.6 | 3.8 | 13.09 |
| 10 | 0.3 | 0.7 | 75 | 63.5 | 4.8 | 12.85 |

TABLE IV

Examples 11-12.

| Example | AS-3 (mg) | AS-4 (mg) | LCBs (per million) | Mw (kg/mol) |
|---|---|---|---|---|
| 11 | 100 | 0 | 1.9 | 312 |
| 12 | 0 | 100 | 0.88 | 317 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of" unless specifically stated otherwise):

Aspect 1. A polymerization process (or a method of controlling LCB content) comprising:
  (a) contacting a metallocene compound, an organoaluminum compound, a first "high LCB" activator-support, and a second "low LCB" activator-support to form a catalyst composition;
  (b) contacting the catalyst composition with ethylene and an optional olefin comonomer in a polymerization reactor system under polymerization conditions to produce an ethylene polymer having a long chain branch (LCB) content; and (c) controlling a relative amount of the first "high LCB" activator-support and the second "low LCB" activator-support in the catalyst composition in step (a) to adjust (e.g., control or vary) the LCB content of the ethylene polymer.

Aspect 2. The process defined in aspect 1, wherein:
the first "high LCB" activator-support comprises a fluorided solid oxide; and
the second "low LCB" activator-support comprises a sulfated solid oxide.

Aspect 3. The process defined in aspect 1, wherein:
the first "high LCB" activator-support comprises fluorided silica-coated alumina; and
the second "low LCB" activator-support comprises sulfated bentonite and/or sulfated alumina.

Aspect 4. The process defined in any one of aspects 1-3, wherein step (a) comprises pre-contacting the organoaluminum compound, the first "high LCB" activator-support, and the second "low LCB" activator-support, and then contacting the metallocene compound, to form the catalyst composition.

Aspect 5. The process defined in any one of aspects 1-3, wherein step (a) comprises contacting the organoaluminum compound, the first "high LCB" activator-support, the second "low LCB" activator-support, and the metallocene compound substantially contemporaneously to form the catalyst composition.

Aspect 6. A catalyst composition comprising:
(i) a first activator-support comprising a fluorided solid oxide;
(ii) a second activator-support comprising a sulfated solid oxide;
(iii) a metallocene compound; and
(iv) an organoaluminum compound.

Aspect 7. A catalyst composition comprising:
(i) a first activator-support comprising fluorided silica-coated alumina;
(ii) a second activator-support comprising sulfated bentonite and/or sulfated alumina;
(iii) a metallocene compound; and
(iv) an organoaluminum compound.

Aspect 8. The process or composition defined in any one of the preceding aspects, wherein the second activator-support comprises sulfated bentonite.

Aspect 9. The process or composition defined in any one of the preceding aspects, wherein the activator-support contains from 1 to 30 wt. %, from 2 to 20 wt. %, from 2 to 15 wt. %, from 2 to 10 wt. %, or from 3 to 10 wt. %, of the electron-withdrawing anion, based on the total weight of the respective activator-support.

Aspect 10. The process or composition defined in any one of the preceding aspects, wherein the organoaluminum compound comprises any suitable organoaluminum compound, e.g., trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 11. The process or composition defined in any one of aspects 1-10, wherein the metallocene compound comprises any suitable bridged metallocene compound or any bridged metallocene compound disclosed herein.

Aspect 12. The process or composition defined in any one of aspects 1-11, wherein the metallocene compound comprises a bridged zirconium based metallocene compound with a fluorenyl group.

Aspect 13. The process or composition defined in any one of aspects 1-11, wherein the metallocene compound comprises a bridged zirconium or hafnium based metallocene compound with a cyclopentadienyl group and a fluorenyl group.

Aspect 14. The process or composition defined in any one of aspects 1-11, wherein the metallocene compound comprises a bridged zirconium or hafnium based metallocene compound with a fluorenyl group, and an aryl group and/or an alkenyl group on the bridging group.

Aspect 15. The process or composition defined in any one of aspects 1-11, wherein the metallocene compound comprises a bridged zirconium or hafnium based metallocene compound with a cyclopentadienyl group and fluorenyl group, and an aryl group and/or an alkenyl group on the bridging group.

Aspect 16. The process or composition defined in aspect 14 or 15, wherein the aryl group is a phenyl group and the alkenyl group is a terminal alkenyl group.

Aspect 17. The process or composition defined in any one of aspects 1-11, wherein the metallocene compound comprises a bridged zirconium or hafnium based metallocene compound with two cyclopentadienyl groups, two indenyl groups, or a cyclopentadienyl and an indenyl group.

Aspect 18. The process or composition defined in any one of aspects 1-11, wherein the metallocene compound comprises a bridged zirconium based metallocene compound with two indenyl groups.

Aspect 19. The process or composition defined in any one of aspects 11-18, wherein the bridging group contains a single silicon bridging atom, a single carbon bridging atom, or a two carbon atom chain.

Aspect 20. The process or composition defined in any one of aspects 1-10, wherein the metallocene compound comprises any suitable unbridged metallocene compound or any unbridged metallocene compound disclosed herein.

Aspect 21. The process or composition defined in any one of aspects 1-10, wherein the metallocene compound comprises an unbridged zirconium or hafnium based metallocene compound containing two cyclopentadienyl groups, two indenyl groups, or a cyclopentadienyl and an indenyl group.

Aspect 22. The process or composition defined in any one of aspects 1-10, wherein the metallocene compound comprises an unbridged zirconium based metallocene compound containing two cyclopentadienyl groups, two indenyl groups, or a cyclopentadienyl and an indenyl group.

Aspect 23. The process or composition defined in any one of aspects 1-10, wherein the metallocene compound comprises:
(1) rac-ethylene-bis(1-indenyl) zirconium dichloride;
(2) methyl(buten-3-yl)methylidene($\eta$5-cyclopentadien-1-ylidene)($\eta$5-2,7-di-tert-butylfluoren-9-ylidene) zirconium dichloride;
(3) diphenylmethydene[$\eta$5-[3-(pent-4-enyl)cyclopentadien-1-ylidene]][$\eta$5-(2,7-di-tert-butylfluoren-9-ylidene)] hafnium dichloride;
(4) (n-butylcyclopentadienyl)(1-allylindenyl)zirconium dichloride;
(5) rac-dimethylsilylbis(1-indenyl)zirconium dichloride;
(6) 1-ethylpropylidene[($\eta$5-cyclopentadien-1-ylidene) ($\eta$5-(3-propyl)inden-1-ylidene] zirconium dichloride;
or any combination thereof.

Aspect 24. The process or composition defined in any one of aspects 1-23, wherein the catalyst composition contains one metallocene compound.

Aspect 25. The process or composition defined in any one of aspects 1-23, wherein the catalyst composition contains two or more metallocene compounds.

Aspect 26. The process or composition defined in any one of the preceding aspects, wherein a weight ratio of the metallocene compound(s) to the activator-supports is in any suitable range of weight ratios, e.g., from 1:1 to 1:100,000, from 1:10 to 1:10,000, from 1:20 to 1:1000, or from 1:50 to 1:500.

Aspect 27. The process or composition defined in any one of the preceding aspects, wherein a molar ratio of the organoaluminum compound to the metallocene compound is in any suitable range of molar ratios, e.g., from 1:1 to 1000:1, from 1:1 to 100:1, from 2:1 to 200:1, or from 5:1 to 100:1.

Aspect 28. The process or composition defined in any one of the preceding aspects, wherein a weight ratio of the activator-supports to the organoaluminum compound is in any suitable range of weight ratios, e.g., from 100:1 to 1:100, from 10:1 to 1:10, from 5:1 to 1:5, or from 2:1 to 1:2.

Aspect 29. The process or composition defined in any one of the preceding aspects, wherein a weight ratio of the first activator-support to the second activator-support is in any suitable range of weight ratios, e.g., from 100:1 to 1:100, from 10:1 to 1:10, from 5:1 to 1:5, from 2:1 to 1:2, or from 1.5:1 to 1:1.5.

Aspect 30. The process or composition defined in any one of the preceding aspects, wherein the catalyst composition is substantially free of aluminoxane compounds, organoboron or organoborate compounds, ionizing ionic compounds, or combinations thereof.

Aspect 31. A polymerization process comprising contacting the catalyst composition defined in any one of aspects 6-30 with ethylene and an optional olefin comonomer in a polymerization reactor system under polymerization conditions to produce an ethylene polymer.

Aspect 32. The process defined in any one of the preceding aspects, wherein the optional olefin comonomer comprises a $C_3$-$C_{20}$ alpha-olefin.

Aspect 33. The process defined in any one of the preceding aspects, wherein the catalyst composition is contacted with ethylene and an olefin comonomer comprising a $C_3$-$C_{10}$ alpha-olefin.

Aspect 34. The process defined in any one of the preceding aspects, wherein the catalyst composition is contacted with ethylene and an olefin comonomer comprising 1-butene, 1-hexene, 1-octene, or a mixture thereof.

Aspect 35. The process defined in any one of the preceding aspects, wherein the polymerization reactor system comprises a batch reactor, a slurry reactor, a gas-phase reactor, a solution reactor, a high pressure reactor, a tubular reactor, an autoclave reactor, or a combination thereof.

Aspect 36. The process defined in any one of the preceding aspects, wherein the polymerization reactor system comprises a slurry reactor, a gas-phase reactor, a solution reactor, or a combination thereof.

Aspect 37. The process defined in any one of the preceding aspects, wherein the polymerization reactor system comprises a loop slurry reactor.

Aspect 38. The process defined in any one of aspects 1-37, wherein the polymerization reactor system comprises a single reactor.

Aspect 39. The process defined in any one of aspects 1-37, wherein the polymerization reactor system comprises 2 reactors.

Aspect 40. The process defined in any one of aspects 1-37, wherein the polymerization reactor system comprises more than 2 reactors.

Aspect 41. The process defined in any one of the preceding aspects, wherein the ethylene polymer comprises an ethylene homopolymer, an ethylene/1-butene copolymer, an ethylene/1-hexene copolymer, an ethylene/1-octene copolymer, or any combination thereof.

Aspect 42. The process defined in any one of the preceding aspects, wherein the ethylene polymer comprises an ethylene/1-hexene copolymer.

Aspect 43. The process defined in any one of the preceding aspects, wherein the ethylene polymer has any suitable LCB content, e.g., from 1 to 150 LCBs, from 1 to 10 LCBs, from 10 to 150 LCBs, or from 15 to 100 LCBs, per million total carbon atoms.

Aspect 44. The process defined in any one of the preceding aspects, further comprising the steps of:
determining (or measuring) the LCB content of the ethylene polymer; and
adjusting the relative amount of the first "high LCB" activator-support and the second "low LCB" activator-support in the catalyst composition based on the difference between the measured LCB content and a target LCB content.

Aspect 45. The ethylene polymer produced by the process defined in any one of the preceding aspects.

Aspect 46. An article of manufacture comprising the ethylene polymer defined in aspect 45.

We claim:
1. A catalyst composition comprising:
(i) a first activator-support comprising a fluorided silica-coated alumina;
(ii) a second activator-support comprising a sulfated bentonite;
(iii) a metallocene compound; and
(iv) an organoaluminum compound.
2. The composition of claim 1, wherein:
a weight ratio of the metallocene compound to the activator-supports is in a range from 1:1 to 1:100,000; and
a molar ratio of the organoaluminum compound to the metallocene compound is in a range from 1:1 to 1000:1.
3. The composition of claim 1, wherein a weight ratio of the first activator-support to the second activator-support is in a range from 10:1 to 1:10.
4. The composition of claim 1, wherein the catalyst composition is substantially free of aluminoxane compounds, organoboron or organoborate compounds, ionizing ionic compounds, or combinations thereof.
5. The composition of claim 1, wherein the catalyst composition contains two or more metallocene compounds.
6. The composition of claim 1, wherein the metallocene compound comprises:
(1) rac-ethylene-bis(1-indenyl) zirconium dichloride;
(2) methyl(buten-3-yl)methylidene(η5-cyclopentadien-1-ylidene)(η5-2,7-di-tert-butylfluoren-9-ylidene) zirconium dichloride;
(3) diphenylmethylidene[η5-[3-(pent-4-enyl)cyclopentadien-1-ylidene]][η5-(2,7-di-tert-butylfluoren-9-ylidene)] hafnium dichloride;
(4) (n-butylcyclopentadienyl)(1-allylindenyl)zirconium dichloride;
(5) rac-dimethylsilylbis(1-indenyl)zirconium dichloride;
(6) 1-ethylpropylidene[(η5-cyclopentadien-1-ylidene) (η5-(3-propyl)inden-1-ylidene)] zirconium dichloride; or
any combination thereof.

7. The composition of claim 1, wherein the metallocene compound comprises:
- a bridged zirconium or hafnium based metallocene compound with a cyclopentadienyl group and a fluorenyl group;
- a bridged zirconium based metallocene compound containing two cyclopentadienyl groups, two indenyl groups, or a cyclopentadienyl and an indenyl group;
- an unbridged zirconium or hafnium based metallocene compound containing two cyclopentadienyl groups, two indenyl groups, or a cyclopentadienyl and an indenyl group; or
- any combination thereof.

8. The composition of claim 1, wherein the organoaluminum compound comprises trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, or any combination thereof.

9. The composition of claim 8, wherein a molar ratio of the organoaluminum compound to the metallocene compound is in a range from 2:1 to 200:1.

10. The composition of claim 8, wherein a weight ratio of the activator-supports to the organoaluminum compound is in a range from 100:1 to 1:100.

11. The composition of claim 8, wherein a weight ratio of the first activator-support to the second activator-support is in a range from 5:1 to 1:5.

12. The composition of claim 8, wherein the metallocene compound comprises:
(1) rac-ethylene-bis(1-indenyl) zirconium dichloride; and/or
(5) rac-dimethylsilylbis(1-indenyl)zirconium dichloride.

13. The composition of claim 8, wherein the fluorided silica-coated alumina comprises from 2 to 15 wt. % fluoride.

14. The composition of claim 8, wherein the fluorided silica-coated alumina comprises from 15 to 60 wt. % silica, based on a weight of silica-coated alumina.

15. A catalyst composition comprising:
(i) a first activator-support comprising a fluorided silica-coated alumina;
(ii) a second activator-support comprising a sulfated bentonite, the sulfated bentonite containing from 28 to 32 wt. % silicon;
(iii) a metallocene compound; and
(iv) an organoaluminum compound.

16. The composition of claim 15, wherein the sulfated bentonite contains from 0.08 to 0.14 wt. % sodium.

17. The composition of claim 15, wherein the sulfated bentonite contains from 2.8 to 4.8 wt. % sulfur.

18. The composition of claim 15, wherein the sulfated bentonite is characterized by a residual acidity value of from 3 to 14 mg KOH/g.

19. The composition of claim 15, wherein the fluorided silica-coated alumina comprises from 2 to 15 wt. % fluoride.

20. The composition of claim 15, wherein the fluorided silica-coated alumina comprises from 15 to 60 wt. % silica, based on a weight of silica-coated alumina.

21. The composition of claim 15, wherein the metallocene compound comprises:
(1) rac-ethylene-bis(1-indenyl) zirconium dichloride;
(2) methyl(buten-3-yl)methylidene($\eta$5-cyclopentadien-1-ylidene)($\eta$5-2,7-di-tert-butylfluoren-9-ylidene) zirconium dichloride;
(3) diphenylmethylidene[$\eta$5-[3-(pent-4-enyl)cyclopentadien-1-ylidene]][$\eta$5-(2,7-di-tert-butylfluoren-9-ylidene)] hafnium dichloride;
(4) (n-butylcyclopentadienyl)(1-allylindenyl)zirconium dichloride;
(5) rac-dimethylsilylbis(1-indenyl)zirconium dichloride;
(6) 1-ethylpropylidene[($\eta$5-cyclopentadien-1-ylidene)($\eta$5-(3-propyl)inden-1-ylidene)] zirconium dichloride; or
any combination thereof.

* * * * *